Patented July 7, 1953

2,644,808

UNITED STATES PATENT OFFICE 2,644,808

N-CARBOANHYDRIDES AND POLYMERS THEREFROM

Merlin Martin Brubaker, Chadds Ford, Pa., and Robert Neal MacDonald, New Castle, Del., assignors to E. I. du Pont de Nemours & Company, Wilmington, Del., a corporation of Delaware No Drawing. Application December 7, 1948, Serial No. 64,042

13 Claims. (Cl. 260—78)

This invention relates to N-carboanhydrides of selected alpha-amino acids and the polymers therefrom.

The N-carboanhydrides of amino hydrogen-containing alpha-amino acids having at least one hydrogen on the alpha-carbon have been known for some time. It is also known that these N-carboanhydrides can undergo polymerization with evolution of carbon dioxide to form polyamides. Thus Woodward and Schramm, J. Am. Chem. Soc., 69, 1551–1552 (1947), report the preparation of a film-forming polyamide by the polymerization of a mixture of the N-carboanhydrides of L-leucine and DL-phenylalanine. However, polyamides from this type of alpha-amino acid (i. e., those containing at least one hydrogen on the alpha-carbon) are relatively poor in heat resistance and thus suffer thermal degradation at temperatures lower than those desired for high quality polyamides. Furthermore, the N-carboanhydrides of this type of alpha-amino acid are in themselves relatively poor in heat resistance and decompose at relatively low temperatures with concomitant polymerization, thus making their preparation and purification to the high level necessary for good polymer formation more difficult and much less efficient.

N-carboanhydrides of amino hydrogen-containing alpha-amino acids whose alpha-carbon is an annular member of a cycloaliphatic ring are disclosed in the copending application of MacDonald, Serial No. 766,458, filed August 5, 1947. This application also discloses that these N-carboanhydrides can be polymerized and copolymerized, for example, with the N-carboanhydrides of other types of amino acids to form linear polyamides. Although polyamides from this type of alpha-amino acid exhibit greatly improved thermal stability, they are not soluble in as wide a range of organic solvents as is desired.

This invention has as an object the preparation of N-carboanhydrides of improved thermal stability. A further object is the preparation of more readily purified N-carboanhydrides. Another object is the preparation from N-carboanhydrides of thermally stable condensation polyamides soluble in a wide range of organic solvents. Other objects will appear hereinafter.

These objects are accomplished by the invention of N-carboanhydrides of alpha-amino acids which acids have primary alkyl groups on the alpha-carbon, i. e., the carbon bearing the carboxyl and amino groups, have hydrogen on the amino nitrogen and have a total of three to six carbons on the amino nitrogen and alpha-carbon, i. e., by the invention of N-carboanhydrides of saturated aliphatic monoamino monocarboxylic acids containing only five to eight carbons, hydrogen, the one amino nitrogen and the two carboxyl oxygens and the preparation from these N-carboanhydrides, by thermal condensation with carbon dioxide evolution, of condensation polymers characterized by recurring units

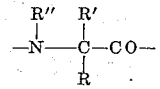

wherein R' and R are primary alkyl groups and R'' is $C_nH_{2n+1}$ where $n$ is a cardinal number and the total number of carbons in R, R', and R'' is from 3 to 6.

The new polyamides of this invention are outstanding in thermal stability as compared with the alpha-amino acid polyamides previously known in the art. In addition, they exhibit good solubility in a wide range of organic solvents, thus making them as readily handleable in normal solution casting and wet spinning procedures as any of the alpha-amino acid polyamides previously known. Thus, a polymer from the N-carboanhydride of alpha-amino-alpha-methylbutyric acid, one of the novel N-carboanhydrides of this invention, remains on a copper block heated to 225° C. and exposed to the oxidative degradation of the air for three hours without evidencing any visible changes in appearance or properties. In contrast, a polyamide from a 1:1 mixture, by weight, of the N-carboanhydrides of L-leucine and DL-phenylalanine under the same conditions discolors noticeably, becomes appreciably dark, and loses a great deal of its strength in only two minutes. Both of these polyamides exhibit approximately the same solubilities in organic solvents. The polyamide from the N-carboanhydride of 1-amino-cyclohexanecarboxylic acid (a representative alpha-amino acid whose alpha-carbon is an annular member of a cycloaliphatic ring) while exhibiting the same high thermal insensitivity as the above-noted polyamide from the N-carboanhydride of alpha-amino-alpha-methylbutyric acid is generally insoluble in organic solvents. However, as noted above, the polyamide from the N-carboanhydride of alpha-amino-alpha-methylbutyric acid is soluble in a wide range of normally used organic solvents, such as for example chloroform and m-cresol.

The novel N-carboanhydrides of this invention are markedly more heat resistant, i. e., more thermally stable than the previously known N-carboanhydrides of alpha-amino acids. They can be heated to higher temperatures before evidencing any appreciable sign of thermal decomposition and subsequent polymerization—a very valuable property since it allows the preparation of these N-carboanhydrides to be carried out at higher reaction temperatures than are possible with most of the N-carboanhydrides previously known. This increased thermal stability also allows these N-carboanhydrides to be purified by repeated recrystallizations at higher solution temperatures with no concomitant loss by thermal condensation, thus making easier and more efficient their purification to the high levels of purity necessary for their molecular weight polyamide formation. Although this property of greater thermal stability makes it somewhat more difficult to polymerize these N-carboanhydrides thermally, the advantages gained in the preparation of the N-carboanhydrides overbalances this difficulty.

The N-carboanhydrides may be prepared from the corresponding amino acids by the method of Leuchs, Ber. 39, 857–861 (1906), which can be represented by the following equations:

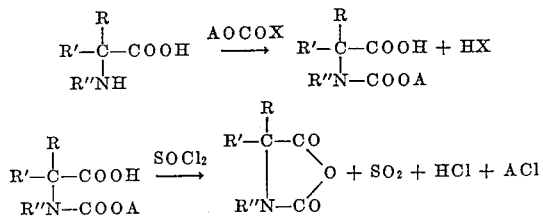

where R, R', and R'' are as previously, A is alkyl or aralkyl and X is halogen.

They may also be prepared from the amino acids or their alkali or alkaline earth metal salts and phosgene as described in the copending application of MacDonald, Serial No. 778,458, filed October 7, 1947, or from the amino acids, their alkali or alkaline earth metal salts, or their hydrohalide salts and phosgene in the presence of a hydrocarbon ether as described in the copending application of W. W. Prichard, Serial No. 52,971, filed October 5, 1948. These methods may be represented by the following general equation:

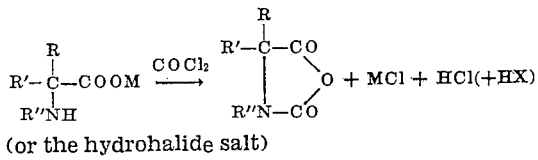

(or the hydrohalide salt)

wherein R, R', and R'' are as given previously, HX is a hydrohalide and M is hydrogen or an alkali or alkaline earth metal.

The N-carboanhydrides may also be prepared by the method disclosed in the copending application of W. W. Prichard, Serial No. 778,457, filed October 7, 1947, now Patent No. 2,516,145. The method comprises treating an alpha-amino acid having at least one hydrogen atom on the nitrogen in an anhydrous solvent with an alkali metal alkoxide and with carbon dioxide thereby forming the dialkali metal salt of the alpha-carboxyaminocarboxylic acid and reacting under anhydrous conditions thionyl chloride with said dialkali metal salt of the alpha-carboxyaminocarboxylic acid to form the N-carboanhydride.

These N-carboanhydrides, taken singly or in mixtures with themselves or other N-carboanhydrides, at least 10% of such N-carboanhydride mixture consisting of one or more N-carboanhydride of this invention can be polymerized, in bulk or in solution, with decomposition attended by carbon dioxide evolution, thermally, or initiated by water, alcohols, phenols, or by amino hydrogen-bearing amines as disclosed in the copending application of MacDonald, Serial No. 778,032, filed October 4, 1947. This polymerization is represented by the following equation, utilizing a general formula for the N-carboanhydrides of this invention, where the R's are as given previously:

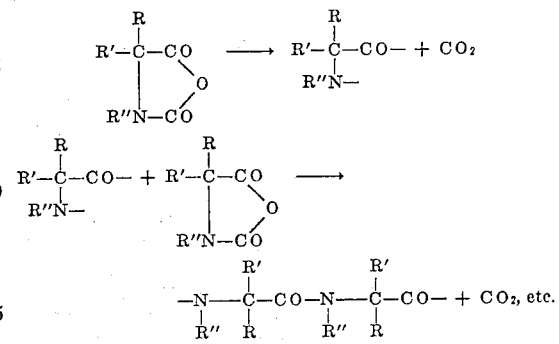

Thus the polyamides of this invention are characterized by a plurality of recurring

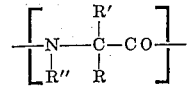

units.

The following examples in which parts are by weight are illustrative of the invention.

EXAMPLE I

PREPARATION OF THE N-CARBOANHYDRIDE OF
N-METHYL-ALPHA-AMINOISOBUTYRIC ACID

*Preparation of N-methyl-N-carbobenzyloxy-alpha-aminoisobutyric acid*

To a mixture of 20 parts of sodium hydroxide dissolved in 255 parts of water and 58.5 parts of N-methyl-alpha-aminoisobutyric acid are added simultaneously during agitation at ice-bath temperature 85.3 parts of carbobenzyloxy chloride (prepared as described in "Organic Syntheses," volume XXIII, page 13) and a solution of 20 parts of sodium hydroxide dissolved in 127.5 parts of water over a period of one hour in such a fashion that the acid chloride is in excess of the alkali until the end of the acylation. After being stirred for an additional two hours in an ice-bath, the reaction mixture is extracted several times with ether and made acid with concentrated aqueous hydrochloric acid at 10° C. The white crystalline precipitate so obtained is removed by filtration, freed of chloride ions by repeated washings with water and dried in a vacuum desiccator over anhydrous calcum chloride under reduced pressure. There is thus obtained 43 parts (34% of theory) of N - methyl - N - carbobenzyloxy - alpha-aminoisobutyric acid as colorless crystals melting at 120–121° C.

*Analysis.*—Calculated for $C_{13}H_{17}NO_4$: N, 5.58%; acid number 223.3. Found: N, 5.76%; acid number 223.5.

*Preparation of the N-carboanhydride of N-methyl-alpha-aminoisobutyric acid*

In a reactor open to the atmosphere only through a drying tube, eight parts of the above N - methyl - N - carbobenzyloxy - alpha - aminoisobutyric acid is mixed with 21.3 parts of thionyl chloride. Vigorous evolution of sulfur dioxide and hydrogen chloride begins at once. The reaction mixture is allowed to stand at room temperature over night and the thionyl chloride is removed from the resulting clear solution by distillation under reduced pressure. The residue is washed thoroughly with petroleum ether and the solid product (2.85 parts = 66% of theory) removed by filtration under anhydrous conditions. This product is then extracted with 70.8 parts of anhydrous diethyl ether and the undissolved portion removed by filtration. Petroleum ether is added slowly with stirring to the clear, ether filtrate until a slight cloudiness is obtained. The solution is then cooled in an ice-salt bath, and the solid precipitate formed is removed by filtration. There is thus obtained 1.15 parts (27% of theory) of pure N-carboanhydride of N-methyl-alpha-aminoisobutyric acid as colorless crystals melting at 62.9–63.1° C.

*Analysis.*—Calculated for $C_6H_9NO_3$: C, 50.34%; H, 6.34%; N, 9.79%. Found: C, 50.77%; H, 6.39%; N, 9.89%.

The N-carboanhydrides may be prepared not only, as above, by the method of Leuchs et al. as applied to alpha-amino-alpha,alpha-diprimary-alkylacetic acids, but also, as in Example II below, by the method of W. W. Prichard, Serial No. 52,971, filed October 5, 1948, applied to these acids.

EXAMPLE II

PREPARATION OF THE N-CARBOANHYDRIDE OF N-METHYL-ALPHA-AMINOISOBUTYRIC ACID

Gaseous phosgene is slowly passed into a well-stirred suspension of 15 parts of N-methyl-alpha-aminoisobutyric acid hydrochloride in 300 parts of purified, anhydrous dioxane in a reactor open to the atmosphere only through a drying tube and equipped with a reflux water condenser and entry and exit ports, while maintaining the temperature at 80° C. until 9.8 parts (100% of theory) of phosgene is added. The reaction mixture is cooled to room temperature and the insoluble portion [3.6 parts (24% recovery) of unreacted N-methyl-alpha-aminoisobutyric acid hydrochloride] is removed by filtration under anhydrous conditions. The dioxane is removed from the clear filtrate by distillation and sufficient petroleum ether is added with stirring to the resulting concentrate to precipitate the N-carboanhydride which is then removed by filtration. There is thus obtained six parts (43% of theory) of the white, crystalline N-carboanhydride of N-methyl-alpha-aminoisobutyric acid.

The preparation of homopolyamides and copolyamides from the N-carboanhydrides of this inevntion is illustrated in Examples III through VI below using the N-carboanhydride of N-methyl-alpha-aminoisobutyric acid.

EXAMPLE III

POLYAMIDE FROM THE N-CARBOANHYDRIDE OF N-METHYL-ALPHA-AMINOISOBUTYRIC ACID

One part of the N-carboanhydride of N-methyl-alpha-aminoisobutyric acid is heated at 115° C. for eleven days in 21.7 parts of xylene containing 0.002 part (0.3 mole per cent based on N-carboanhydride) of cyclohexylamine. The high molecular weight polyamide of N-methyl-alpha-aminoisobutyric acid thus obtained is a tan, infusible, thermally stable powder, soluble in m-cresol, water, xylene, and alcohol.

EXAMPLE IV

COPOLYAMIDE FROM A 1:1 MIXTURE OF THE N-CARBOANHYDRIDES OF N-METHYL-ALPHA-AMINOISOBUTYRIC ACID AND 1-AMINOCYCLOHEXANECARBOXYLIC ACID

A mixture of five parts each of the N-carboanhydrides of N-methyl-alpha-aminoisobutyric acid and 1-aminocyclohexanecarboxylic acid and 0.019 part (0.3 mole per cent based on the total N-carboanhydrides) of cyclohexylamine in 217 parts of xylene is heated for ten days at 115° C. There is thus obtained a high molecular weight copolyamide of N-methyl-alpha-aminoisobutyric acid and 1-aminocyclohexanecarboxylic acid as a tan, infusible, thermally stable powder, soluble in m-cresol.

EXAMPLE V

COPOLYAMIDE FROM A 1:1 MIXTURE OF THE N-CARBOANHYDRIDES OF N-METHYL-ALPHA-AMINOISOBUTYRIC ACID AND ALPHA-AMINOISOBUTYRIC ACID

A mixture of five parts each of the N-carboanhydrides of N-methyl-alpha-aminoisobutyric acid and alpha-aminoisobutyric acid and 0.022 part (0.3 mole per cent based on the total N-carboanhydrides) of cyclohexylamine in 217 parts of xylene is heated for ten days at 115° C. There is thus obtained a high molecular weight copolyamide of N-methyl-alpha-aminoisobutyric acid and alpha-aminoisobutyric acid as a white, infusible powder, soluble in m-cresol. This polymer withstands heating at elevated temperatures more than twice as long as the copolyamide from a 1:1 mixture of the N-carboanhydrides of L-leucine and DL-phenylalanine before discoloration can be noted.

EXAMPLE VI

COPOLYAMIDE FROM A 1:1 MIXTURE OF THE N-CARBOANHYDRIDES OF N-METHYL-ALPHA-AMINOISOBUTYRIC ACID AND 2-AMINO-4,6,6-TRIMETHYLHEPTANOIC ACID

A mixture of 25 parts each of the N-carboanhydrides of N-methyl-alpha-aminoisobutyric acid and 2-amino-4,6,6-trimethylheptanoic acid (prepared as described in the copending application of MacDonald, Serial No. 778,459, filed October 7, 1947) and 0.09 part (0.3 mole per cent based on the total N-carboanhydrides) of cyclohexylamine is heated in 1085 parts of xylene for ten days at 115° C. There is thus obtained a high molecular weight copolyamide of N-methyl-alpha-aminoisobutyric acid and 2-amino-4,6,6-trimethylheptanoic acid as a thermally stable, infusible, white powder, soluble in chloroform and m-cresol.

EXAMPLE VII

PREPARATION OF THE N-CARBOANHYDRIDE OF ALPHA-AMINODIETHYLACETIC ACID

*Preparation of N-carbobenzyloxy-alpha-amino-diethylacetic acid*

To a mixture of 106 parts of 2.015 N sodium hydroxide solution and 26 parts of alpha-aminodiethylacetic acid are added simultaneously during agitation at ice-bath temperature 56.5 parts of 4.029 N sodium hydroxide solution and 34.1 parts of carbobenzyloxychloride over a period of 50 minutes in such a fashion that the acid chloride is in excess of the alkali until the end of the acylation. After being stirred for an additional one hour in an ice-bath, the reaction mixture is extracted several times with ether and made acid with concentrated aqueous hydrochloric acid at 0° C. The white, pasty mass so obtained is removed by filtration and dissolved in ether. The aqueous filtrate is extracted several times with ether and this extract combined with the ether solution. The combined solution is washed three times with cold salt water, twice with cold distilled water and then dried overnight over anhydrous calcium sulfate. The ether is removed by distillation under reduced pressure. There is thus obtained 14.4 parts (27% of theory) of N-carbobenzyloxy-alpha-aminodiethylacetic acid as white crystals melting sharply at 96.5° C.

*Analysis.*—Calculated for $C_{14}H_{19}NO_4$: Acid number 211.5; N, 5.28%. Found: Acid number 212.6; N, 5.33%.

*Preparation of the N-carboanhydride of alpha-aminodiethylacetic acid*

In a reactor open to the atmosphere only through a drying tube, 3.8 parts of the above N-carbobenzyloxy-alpha-aminodiethylacetic acid is mixed with 17.7 parts of thionyl chloride. Evolution of sulfur dioxide and hydrogen chloride begins after about fifteen minutes. The reaction mixture is allowed to stand at room temperature overnight, and the thionyl chloride is removed from the resulting clear solution by distillation at ice-bath temperature to 40° C. under pressures of from 16 to 2 millimeters of mercury. The resulting oil is heated for one hour at 100° C. under a pressure of 2 millimeters of mercury. The thick oil so obtained is found by analysis to contain 8.74% N. The theoretical value for the N-carboanhydride of alpha-aminodiethylacetic acid ($C_7H_{11}NO_3$) is 8.88% N. Upon standing this oil becomes crystalline. After recrystallization from ether/petroleum ether mixture there are obtained white crystals of the N-carboanhydride of alpha-aminodiethylacetic acid melting at 45–47° C. (capillary tube in melting point bath).

EXAMPLE VIII

PREPARATION OF THE N-CARBOANHYDRIDE OF ALPHA-AMINODIETHYLACETIC ACID

Gaseous phosgene is slowly passed under a positive pressure of 2 millimeters of mercury into a well-stirred suspension of ten parts of alpha-aminodiethylacetic acid in 300 parts of purified, anhydrous dioxane in a reactor open to the atmosphere only through a drying tube and equipped with a reflux water condenser and entry and exit ports, while maintaining the temperature at 100° C. until 8.3 parts (110% of theory) of phosgene is added, at which point the suspended amino acid is all dissolved. The reaction mixture is passed through a stripping still at 70° C. under 30 millimeters of mercury pressure to remove most of the dioxane. The remaining traces of the solvent are removed from the residue by heating in a vacuum oven at 78° C. under 0.5 millimeters of mercury pressure for four hours. The resulting colorless oil is taken up in fifteen parts of anhydrous diethyl ether and petroleum ether is added with stirring until no further precipitation occurs. The resulting slurry is cooled in an ice-bath, and the precipitate is removed by filtration under anhydrous conditions. There is thus obtained 7.3 parts (61% of theory) of the N-carboanhydride of alpha-aminodiethylacetic acid as colorless crystals melting at 43° C. (melting point block).

*Analysis.*—Calculated for $C_7H_{11}O_3N$: C, 53.5%; H, 7.0%; N, 8.92%. Found: C, 53.6%; H, 7.1%; N, 8.88%.

EXAMPLE IX

POLYAMIDE FROM THE N-CARBOANHYDRIDE OF ALPHA-AMINODIETHYLACETIC ACID

A mixture of one part of the N-carboanhydride of alpha-aminodiethylacetic acid and 0.001 part (0.16 mole per cent based on the N-carboanhydride) of cyclohexylamine is heated in a narrow reactor open to the atmosphere at one end for five hours at 218° C. There is thus obtained a high molecular weight alpha-aminodiethylacetic acid polyamide as a white, thermally stable solid, soluble in m-cresol.

EXAMPLE X

PREPARATION OF THE N-CARBOANHYDRIDE OF ALPHA-AMINO-ALPHA-METHYLBUTYRIC ACID

*Preparation of N-carbobenzyloxy-alpha-amino-alpha-methylbutyric acid*

To a mixture of 28.2 parts of sodium hydroxide dissolved in 1,000 parts of water and 82.6 parts of alpha-amino-alpha-methylbutyric acid are added simultaneously during agitation at ice-bath temperature 124.5 parts of carbobenzyloxy chloride and a solution of 28.8 parts of sodium hydroxide dissolved in 180 parts of water over a period of 45 minutes in such a fashion that the acid chloride is in excess of the alkali until the end of the acylation. After being stirred for an additional 1.5 hours in an ice-bath, the reaction mixture is extracted several times with ether and made acid with concentrated aqueous hydrochloric acid in the cold. The white oil which separates is taken up in ether and the ethereal solution treated with a saturated aqueous solution of sodium bicarbonate (50% excess). The water layer which separates is treated with decolorizing charcoal, filtered, cooled to 10° C. and acidified with concentrated aqueous hydrochloric acid. The pasty mass which precipitates is removed by filtration, freed of chloride ions by repeated washings with water, and dried in a vacuum desiccator over anhydrous calcium sulfate under reduced pressure. There is thus obtained 70 parts (39.5% of theory) of N-carbobenzyloxy-alpha-amino-methylbutyric acid as colorless crystals melting at 90–93° C.

*Analysis.* — Calculated for $C_{13}H_{17}NO_4$: C, 62.15%; H, 6.82%; N, 5.58%. Neutral equivalent 251.3. Found: C, 62.31%; H, 6.93%; N, 5.34%. Neutral equivalent 250.3.

*Preparation of the N-carboanhydride of alpha-amino-alpha-methylbutyric acid*

In a reactor open to the atmosphere only through a drying tube, a mixture of 25.1 parts of the above N-carbobenzyloxy-alpha-amino-alpha-methylbutyric acid, 23.8 parts of thionyl chloride, and 85.0 parts of anhydrous diethyl ether is refluxed for 4.5 hours. The reaction mixture is allowed to stand at room temperature for an additional 12 hours and then poured into 400 parts of petroleum ether. The clear solution so obtained is cooled in an ice-salt bath for one hour and the solid product which precipitates is removed by filtration under anhydrous conditions. There is thus obtained 10.2 parts (71% of theory) of crude N-carboanhydride of alpha-amino-alpha-methylbutyric acid. The crude material is purified by dissolving in warm anhydrous diethyl ether, treating with decolorizing charcoal, and filtering. It is finally recrystallized by adding excess petroleum ether and cooling. The crystalline product so obtained is removed by filtration under anhydrous conditions. There is thus obtained 8.13 parts (57% of theory) of the pure N-carboanhydride of alpha-amino-alpha-methylbutyric acid as fine, colorless needles melting sharply at 65.5° C.

*Analysis.*—Calculated for $C_6H_9NO_3$: C, 50.34%; H, 6.34%; N, 9.79%. Found: C, 50.70%; H, 6.39%; N, 9.75%.

EXAMPLE XI

BULK POLYMERIZATION OF THE N-CARBOANHYDRIDE OF ALPHA-AMINO-ALPHA-METHYLBUTYRIC ACID

A mixture of five parts of the N-carboanhydride of alpha-amino-alpha-methylbutyric acid and 0.01 part (0.3 mole per cent based on N-carboanhydride) of tetramethylenediamine is heated in a narrow vessel open to the atmosphere at one end for 4.5 hours at 146° C. The high molecular weight polyamide of alpha-amino-alpha-methylbutyric acid thus obtained is a hard, brittle, thermally stable solid, soluble in m-cresol and softening at 260° C.

EXAMPLE XII

SOLUTION POLYMERIZATION OF THE N-CARBOANHYDRIDE OF ALPHA-AMINO-ALPHA-METHYLBUTYRIC ACID

A mixture of five parts of the N-carboanhydride of alpha-amino-alpha-methylbutyric acid, 0.005 part (0.14 mole per cent based on N-carboanhydride) of cyclohexylamine and 166 parts of chlorobenzene is heated at 125° C. for seven days. The high molecular weight polyamide of alpha-amino-alpha-methylbutyric acid thus obtained is an infusible powder, soluble in chloroform and m-cresol. When placed on a copper block for three hours at 225° C. exposed to air, no visible change is noticed, whereas a copolyamide from a 1:1 mixture of the N-carboanhydride of L-leucine and DL-phenylalanine polymer discolors within two minutes at this temperature and the polyamide from the N-carboanhydrides of alpha-aminomyristic and alpha-aminolauric acids discolor within two and five minutes, respectively.

EXAMPLE XIII

COPOLYAMIDE FROM A 1:1 MIXTURE OF THE N-CARBOHYDRIDES OF ALPHA-AMINO-ALPHA-METHYLBUTYRIC ACID AND 1-AMINOCYCLOHEXANECARBOXYLIC ACID

A mixture of five parts each of the N-carboanhydrides of alpha-amino-alpha-methylbutyric acid and 1-aminocyclohexanecarboxylic acid, 0.005 part (0.08 mole per cent based on the total N-carboanhydrides) of cyclohexylamine and 332 parts of chlorobenzene is heated at 125° C. for seven days. The high molecular weight copolyamide of alpha-amino-alpha-methylbutyric acid and 1-aminocyclohexanecarboxylic acid thus obtained is an infusible solid, soluble in chlorobenzene and in boiling m-cresol. No discoloration is noted after three hours on a copper block at 225° C. in the air compared to marked discoloration under those conditions in two minutes for a copolyamide from a 1:1 mixture of the N-carboanhydrides of L-leucine and DL-phenylalanine, respectively, for the polyamides from the N-carboanhydrides of alpha-aminomyristic and alpha-aminolauric acids.

EXAMPLE XIV

PREPARATION OF THE N-CARBOANHYDRIDE OF ALPHA-AMINO-ALPHA,GAMMA-DIMETHYLVALERIC ACID

*Preparation of N-carbobenzyloxy-alpha-amino-alpha,gamma-dimethylvaleric acid*

To a mixture of 22 parts of sodium hydroxide dissolved in 272 parts of water and 80 parts of alpha-amino-alpha,gamma-dimethylvaleric acid are added simultaneously with stirring at ice-bath temperature 93.8 parts of carbobenzyloxy chloride and a solution of 22 parts of sodium hydroxide dissolved in 136 parts of water over a period of 45 minutes in such a fashion that the acid chloride is in excess of the alkali until the end of the acylation. After being stirred for an additional 1.5 hours in an ice-bath, the reaction mixture is extracted with ether several times and made acid with concentrated aqueous hydrochloric acid in the cold. The thick oil thus obtained crystallizes to a white solid upon standing. This crude product is filtered, freed of chloride ions by repeated washings with water and dried. There is thus obtained 96.3 parts (63% of theory) of crude N-carbobenzyloxy-alpha-amino-alpha,gamma-dimethylvaleric acid as white crystals, melting at 111° C.

To a solution of 10 parts of the above material in 66 parts of warm benzene is added 99 parts of warm petroleum ether. The product crystallizes from the resulting clear solution upon standing and is removed by filtration. After drying there is thus obtained 8.2 parts of pure N-carbobenzyloxy - alpha - amino - alpha,gamma - dimethylvaleric acid as colorless crystals, melting at 115–116° C.

*Analysis.*—Calculated for $C_{15}H_{21}NO_4$: C, 64.5%; H, 7.58%; N, 5.01%. Neutral equivalent 279.3. Found: C, 64.83%; H, 7.72%; N, 5.06%. Neutral equivalent 281.3.

*Preparation of the N-carboanhydride of alpha-amino-alpha,gamma-diethylvaleric acid*

In a reactor open to the atmosphere only through a drying tube, a mixture of five parts of the above N-carbobenzyloxy-alpha-amino-alpha,gamma-dimethylvaleric acid and 4.3 parts of thionyl chloride in 17.7 parts of anhydrous diethyl ether is refluxed for six hours and allowed to stand at room temperature for an additional eleven hours. The clear colorless solution is evaporated to give a viscous oil. Trituration with excess petroleum ether at ice-salt bath temperature brings about crystallization, and the solvent is removed from the resulting precipitate by decantation. The product is recrystallized by dissolving it in thhe minimum quantity of ether necessary to effect solution, adding petroleum ether slowly until a slight cloudiness is apparent in the solution and subsequently cooling the mixture at solid carbon dioxide temperature. The crystalline product is removed by filtration under anhydrous conditions. There is thus obtained pure N-carbonanhydride of alpha-amino - alpha,gamma - dimethylvaleric acid as crystals melting sharply at 32.7–33.0° C.

*Analysis.*—Calculated for $C_8H_{13}NO_3$: C, 56.12%; H, 7.66%; N, 8.18%. Found: C, 56.35%; H, 7.66%; N, 8.12%.

EXAMPLE XV

POLYAMIDE FROM ALPHA-AMINO-ALPHA,GAMMA-DIMETHYLVALERIC ACID

A sample of the above N-carboanhydride of alpha-amino-alpha,gamma-dimethylvaleric acid is heated slowly to 222° C. in a narrow reactor open to the atmosphere at one end. When the temperature reaches this point, the liquid melt evolves gas bubbles and there is obtained an alpha-amino-alpha,gamma-dimethylvaleric acid polyamide as an opaque, thermally stable solid.

Although in the foregoing examples certain conditions of reaction time, temperature, proportion, etc. have been given for the preparation of selected examples of the N-carboanhydrides of this invention, it is to be understood that these conditions may be varied in accordance with the general methods hitherto employed in the preparation of N-carboanhydrides of other amino acids.

The present invention is generic to alpha-amino acid N-carboanhydrides of the following type formula

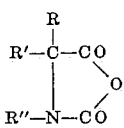

wherein R and R' are primary alkyl groups and R'' is $C_{m-1}H_{2m-1}$ where $m$ is an integer, the total number of carbons in R, R', and R'' is from 3 to 6 and these carbons are alkyl carbons, i. e., carbons of alkyl groups.

Of general utility in the preparation of these N-carboanhydrides are monoamino alkane monocarboxylic acids, i. e., aminoalkanoic acids of the formula

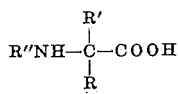

wherein R, R', and R'' are as above. Specific alpha - amino - alpha,alpha - diprimaryalkylacetic acids of this type which may be converted by the methods above described to N-carboanhydrides of this invention include alpha-amino-alpha-(n-propyl)valeric acid, N-methyl-alpha-aminodiethylacetic acid, alpha - amino - alpha-ethylvaleric acid, alpha - amino - alpha - methylcaproic acid, N-ethyl-alpha-aminoisobutyric acid, alpha-amino-alpha-methylvaleric acid, and N-methyl-alpha-amino-alpha-methylbutyric acid.

This invention is likewise generic to the polymers obtained from the N-carboanhydrides of the present invention including the above-mentioned specific N-carboanhydrides. These polymers are linear condensation polyamides having recurring alpha-amino acid units 10 to 100% of which are units of the formula

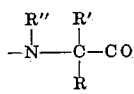

wherein R, R', and R'' are as before. In the case of copolymers there will be recurring structural units of other alpha-amino acids.

Upon hydrolysis with (concentrated aqueous) hydrochloric acid for 15 hours at 150° C. under autogenous pressure in an autoclave, all the polymers of this invention yield at least one amino acid of the general formula

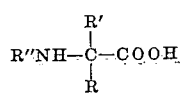

wherein R, R', and R'' are as before. The alpha-amino acids will be found as the hydrogen chloride addition salts of which at least 10% by weight are of the formula

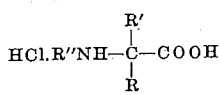

The polymers usually have a degree of polymerization of at least 25, i. e., have at least 25 amino acid units and soften above 125° C. When at least 10% of the recurring units of the polymers are composed of the residues of amino acids of the above indicated type formula, improvements in thermal stability and organic solubility are noted in the polymers. For this reason, copolymers having more than 10% and preferably more than 50% of the units derived from the above described amino acids are preferred.

As specific examples of alpha-amino acids other than those mentioned previously whose N-carboanhydrides can be copolymerized with the N-carboanhydrides of this invention there may be mentioned for example: valine, alanine, leucine, norleucine, isoleucine, methionine, tyrosine, sarcosine (N-methylglycine), N-phenylglycine, 1-amino-cyclopentanecarboxylic acid, 1-amino-2-methylcyclohexanecarboxylic acid.

The polyamides and copolyamides of this invention are prepared optionally in the presence of organic liquids by the condensation polymerization (thermal or initiated by water, alcohols, phenols, organic acids, or amino hydrogen-containing amines) of the previously defined alpha-amino acid N-carboanhydrides with carbon dioxide evolution. Suitable organic liquids that can be used include pyridine, aromatic hydrocarbons, such as: benzene, xylene, etc.; halogenated hydrocarbons, such as: carbon tetrachloride, chloroform, chlorobenzene, etc.; cyclohexane, glycol diethyl ether, and dibutyl ether. The N-carboanhydrides are suitably heated, in a vessel adapted to permit escape of carbon dioxide, to that temperature at which carbon dioxide begins to be evolved at an appreciable rate under the conditions of reaction. This varies with different amino acids, but it is usually at temperatures from 25 to 200° C. and is generally within 50° C. of the melting point of the N-carboanhydrides and in the case of mixtures within 30° of the lowest melting N-carboanhydride. The time of the reaction can be shortened or the temperature necessary can be lowered or both can be accomplished by the use of reaction initiators, e. g., water, alcohol, phenols, organic acids or amino hydrogen-containing amines.

The polyamides and copolyamides of this invention can be used to produce films and fibers. They also can be used in molding and coating compositions. These polyamides are soluble in one or more of the following: water; sulfuric acid; five and six-membered alicyclic ketones liquid below 75° C., for example, cyclopentanone and cyclohexanone; halogenated hydrocarbons liquid below 75° C., e. g., methylene chloride, chloroform, carbon tetrachloride, chlorobenzene, 1,2-di-chloroethane; alcohols, e. g., ethyl alcohol and propyl alcohol; and phenols and thiophenols liquid below 75° C., for example, phenol, chlorophenol, m-cresol, thiophenol, and resorcinol monomethyl ether. These polyamides can be plasticized with high boiling compounds such as polychlorinated diphenyl ether and camphor. The novel polyamides of this invention are outstanding in that they exhibit good thermal stability coupled with solubility in a wide range of organic solvents—a combination of properties long desired for fiber and film outlets.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An N-carboanhydride of the formula

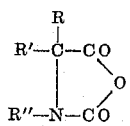

wherein R and R' are primary alkyl groups, R'' is $C_nH_{2n+1}$ where $n$ is a cardinal numeral and the carbons in R, R', and R'' are all alkyl carbons and total from three to six.

2. An N-carboanhydride of the formula

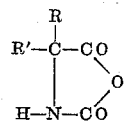

wherein R and R' are primary alkyl groups totaling from three to six carbons.

3. An N-carboanhydride of the formula

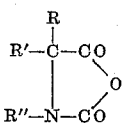

wherein R and R' are primary alkyl groups, R'' is an alkyl group and R, R', and R'' total from three to six carbons.

4. An N-carboanhydride of the formula

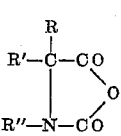

wherein R, R', and R'' are primary alkyl groups and total from three to six carbons.

5. A film- and fiber-forming polymer whose recurring units are alpha-amino acid units, 10–100% of which are of the formula

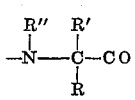

wherein R and R' are primary alkyl groups, R'' is $C_nH_{2n+1}$ where $n$ is a cardinal numeral and the carbons in R, R', and R'' are all alkyl carbons and total from three to six, which polymer has a degree of polymerization of at least 25.

6. A film- and fiber-forming polymer whose recurring units are alpha-amino acid units, 10–100% of which are of the formula

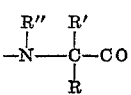

wherein R, R', and R'' are primary alkyl groups and total from three to six carbons, said polymer having a degree of polymerization of at least 25.

7. A polymer according to claim 6 wherein 10–100% of the recurring units are of the formula

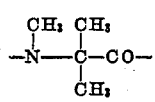

8. A film- and fiber-forming polymer which on hydrolysis with aqueous HCl for 15 hours at 150° C. under autogeneous pressure in an autoclave yields a composition consisting essentially of alpha-amino acid hydrochlorides of which 10 to 100% is of the composition

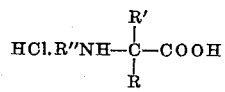

wherein R and R' are primary alkyl groups, R'' is of the formula $C_nH_{2n+1}$ wherein $n$ is a cardinal numeral and the total carbons in R, R', and R'' are alkyl carbons and number from three to six.

9. A film- and fiber-forming polymer which on hydrolysis with aqueous HCl yields a composition consisting essentially of alpha-amino acid hydrochlorides of which 10 to 100% is of the composition

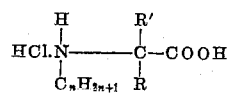

wherein R and R' are primary alkyl groups, $n$ is a cardinal numeral and the total number of carbons in the amino acid hydrochloride is from five to eight.

10. A film- and fiber-forming polymer whose recurring units are alpha-amino acid units, 10–100% of which are of the formula

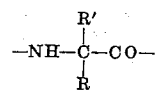

wherein R and R' are primary alkyl groups totaling from 3 to 6 carbons.

11. A polymer according to claim 10 wherein 10–100% of the recurring units are of the formula

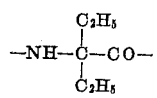

12. A polymer according to claim 10 wherein 10–100% of the recurring units are of the formula

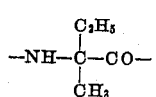

13. A polymer according to claim 10 wherein 10–100% of the recurring units are of the formula

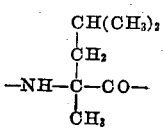

MERLIN MARTIN BRUBAKER.
ROBERT NEAL MacDONALD.

References Cited in the file of this patent

UNITED STATES PATENTS

| Number | Name | Date |
|---|---|---|
| 2,293,388 | Hanford | Aug. 18, 1942 |
| 2,327,162 | Baldwin et al. | Aug. 17, 1943 |
| 2,516,145 | Prichard | July 25, 1950 |
| 2,517,610 | Tullock | Aug. 8, 1950 |

FOREIGN PATENTS

| Number | Country | Date |
|---|---|---|
| 555,129 | Great Britain | Aug. 5, 1943 |

OTHER REFERENCES

Office of Technical Services, PB 34279, 3 pages, December 13, 1946.